United States Patent [19]

Albrinck et al.

[11] Patent Number: 5,558,906

[45] Date of Patent: Sep. 24, 1996

[54] WEAR-RESISTANT DECORATIVE LAMINATES AND METHODS OF PRODUCING SAME

[75] Inventors: Donald J. Albrinck; John J. Mascavage, both of Cincinnati, Ohio

[73] Assignee: Formica Technology Inc., Wilmington, Del.

[21] Appl. No.: 271,349

[22] Filed: Jul. 6, 1994

Related U.S. Application Data

[62] Division of Ser. No. 967,917, Oct. 28, 1992, Pat. No. 5,362,557, which is a continuation of Ser. No. 570,025, Aug. 20, 1990, abandoned.

[51] Int. Cl.$^6$ ............................... B05D 1/18; B05D 1/36
[52] U.S. Cl. ....................... 427/180; 427/202; 427/417; 427/439
[58] Field of Search ..................... 427/180, 196, 427/202, 203, 391, 214, 439, 222, 417; 428/322.2, 323, 327, 329, 204, 208; 156/235, 279, 307.4

[56] References Cited

U.S. PATENT DOCUMENTS

| | | | |
|---|---|---|---|
| Re. 32,152 | 5/1986 | Scher et al. | 428/148 |
| 3,200,008 | 8/1965 | Holtschmidt et al. | 427/411 |
| 3,479,211 | 11/1969 | Goldstein | 427/361 |
| 3,968,291 | 7/1976 | Chevallier | 428/203 |
| 3,975,572 | 8/1976 | Power | 428/252 |
| 4,255,480 | 3/1981 | Scher et al. | 428/208 |
| 4,263,081 | 4/1981 | Scher et al. | 156/279 |
| 4,305,987 | 12/1981 | Scher et al. | 428/148 |
| 4,322,468 | 3/1982 | Raghava | 428/204 |
| 4,327,141 | 4/1982 | Scher et al. | 428/148 |
| 4,395,452 | 7/1983 | Scher et al. | 428/148 |
| 4,400,423 | 8/1983 | Scher et al. | 428/204 |
| 4,430,375 | 2/1984 | Scher et al. | 428/148 |
| 4,473,613 | 9/1984 | Jaisle et al. | 428/220 |
| 4,499,137 | 2/1985 | O'Dell et al. | 428/211 |
| 4,505,974 | 3/1985 | Hosler | 428/329 |
| 4,517,235 | 5/1985 | Ungar et al. | 428/148 |
| 4,520,062 | 5/1985 | Ungar et al. | 428/148 |
| 4,532,170 | 7/1985 | O'Dell et al. | 428/143 |
| 4,567,087 | 1/1986 | O'Dell et al. | 428/211 |
| 4,689,102 | 8/1987 | Prawdzik et al. | 156/235 |
| 4,713,138 | 12/1987 | Ungar et al. | 156/307.4 |
| 4,713,299 | 12/1987 | Taylor et al. | 428/526 |
| 4,741,946 | 5/1988 | Ungar et al. | 428/207 |
| 4,818,271 | 4/1989 | Henrie, II | 504/210 |
| 4,880,689 | 11/1989 | Park et al. | 428/143 |
| 4,898,849 | 2/1990 | Kang | 503/214 |
| 4,940,503 | 7/1990 | Lindgren et al. | 156/279 |
| 4,940,628 | 7/1990 | Lin et al. | 428/323 |
| 4,971,855 | 11/1990 | Lex et al. | 428/206 |
| 4,999,335 | 3/1991 | Mruk et al. | 428/414 |
| 5,037,694 | 8/1991 | Ungar et al. | 428/326 |
| 5,047,440 | 9/1991 | Wilson Jr. | 521/88 |
| 5,229,217 | 7/1993 | Holzer | 428/503 |
| 5,288,540 | 2/1994 | Albrinck et al. | 428/208 |

FOREIGN PATENT DOCUMENTS 1321473  6/1973  United Kingdom.

*Primary Examiner*—Shrive Beck
*Assistant Examiner*—Fred J. Parker

[57] ABSTRACT

Process for the production of decorative laminates having improved scratch, mar, scrape and abrasion resistance comprising the initial step of preparing a mixture of a melamine-formaldehyde resin and an abrasion resistant material, wherein the mixture includes abrasion resistant alumina particles having a particle size of about 25 microns and abrasion resistant alumina particles having a particle size of about 3 microns at a ratio of about 2 to 1; about 0.25 percent silane; about 0.075 percent xanthan gum; and about 0.3 percent to about 1.2 percent polyvinyl alcohol or about 0.1 percent polyethylene glycol distearate having a molecular weight of about 6000, wherein all percentages are measured by weight of the total wet weight of the resin solution of the mixture. The process further includes the steps of simultaneously coating and impregnating a decorative paper sheet with the mixture such that a portion of the amount of melamine-formaldehyde resin required for saturation of the decorative sheet is impregnated therein; dipping the impregnated decorative sheet into an identically formulated mixture or a neat resin bath such that the remaining amount of resin required for saturation is impregnated therein; metering the total amount of melamine-formaldehyde resin impregnated into the decorative sheet; and then drying and consolidating the impregnated decorative sheet. The coating and impregnating step can be performed using either a sparge pipe applicator or a gravure pad coating cylinder.

26 Claims, No Drawings

WEAR-RESISTANT DECORATIVE LAMINATES AND METHODS OF PRODUCING SAME

This is a division of application Ser. No. 07/967,917 filed on Oct. 28, 1992, which is now U.S. Pat. No. 5,362,557 and incorporated by reference herein, and which is a continuation of application Ser. No. 07/570,025, filed Aug. 20, 1990, now abandoned.

BACKGROUND OF THE INVENTION

This invention generally relates to wear resistant decorative laminates having excellent scratch, mar, scrape and abrasion resistance and methods of producing the same. More particularly, this invention relates to wear resistant, decorative laminates employing a decorative sheet saturated with a melamine-formaldehyde resin coating incorporating abrasive materials.

Conventionally, decorative laminates are made of two essential layers: a core layer and a surface layer. The core layer constitutes a bottom or supporting layer onto which the other layer is bonded. In normal high-pressure laminate manufacture, the core layer consists of a plurality of cellulosic sheets. The core sheets are generally made from a kraft paper impregnated with a laminating resin. Laminating resins commonly used for the core layer include phenolic, amino, epoxy, polyester, silicone, and diallyl phthalate resins to name a few. The industrially preferred laminating resin for decorative laminates is a phenolic resin made from the reaction of phenols with formaldehyde.

Placed above the core layer is a decorative layer which is generally an alpha cellulose pigmented paper containing a print, pattern design or solid color that has been impregnated with a melamine-formaldehyde resin.

The cured melamine-formaldehyde resins are colorless and resistant to light; they are resistant to a variety of solvents and stains; and their heat resistance make them resistant to burning cigarettes, boiling water and heated containers up to about 325° F. Without these melamine-formaldehyde resins, the decorative laminate industry would not exist as it is known today. However, because these resins are extremely brittle, they sometimes require reinforcement.

When the decorative layer of the laminate is a printed pattern, it is covered with an overlay as it is commonly referred to, which is a high-quality alpha cellulose paper impregnated with a melamine-formaldehyde resin. This layer protects the decorative print from external abuse such as abrasive wear and tear, harsh chemicals, burns, spills and the like. It is primarily the melamine-formaldehyde resin which accounts for these protective properties. The alpha-cellulose paper acts as a translucent carrier for the water-thin resin, imparts strength to the rather brittle melamine-formaldehyde resin, maintains a uniform resin thickness in the overlay by acting as a shim, and controls resin flow.

The core layer, decorative layer and the overlay surface layer (when needed) are stacked in a superimposed relationship, between polished steel plates and subjected to a pressure and temperature for a time sufficiently long enough to cure the laminating resins impregnating the respective layers. The elevated temperature and pressure actually cause the impregnated resins within the sheets to flow, which consolidates the whole into an integral mass known as the laminate. These laminates are used as surfacings for counter tops, table tops, furniture, store fixtures and the like.

Abrasive materials have previously been employed in the overlay sheet or solid color decorative sheet in order to improve the abrasion resistance of the laminate. The abrasive materials are generally deposited upon the alpha cellulose matrix or, in other applications, mixed with celluosic fibers or microcrystalline materials replacing the alpha cellulose overlay sheet.

Incorporation of abrasive materials in the decorative or overlay sheet can cause severe damage to the delicate, highly polished or intricately etched surfaces of the press plates when the abrasive particles deposited in the decorative or overlay sheet come into contact therewith.

Thus, there exists the need for substitution of a resin in the decorative or overlay sheet that will provide excellent surface damage resistance without damaging the delicate plates. Also incorporation of abrasive materials in laminates can cause objectional wear on materials rubbed across them. The provision for such a layer would fulfill a long-felt need and constitute a significant advance in the art.

DESCRIPTION OF THE PRIOR ART

Prior art procedures for the manufacture of abrasion-resistant decorative laminates, such as those taught in U.S. Pat. No. 4,255,480, have generally required a multi-step process in which the decorative facing sheet is first coated with a binder/mineral mixture and then dried to bind the abrasion-resistant mineral to the decorative sheet. The dry coated decorative sheet is then impregnated with a thermosetting resin. However, this particular prior art process calls for the utilization of a binding material compatible with the thermosetting resin, namely microcrystalline cellulose, to bind the mineral particles to the decorative sheet. Thus, this prior art process requires a specific binding compound compatible with the thermosetting resin, and separate coating, drying and impregnating steps.

Others have attempted production of mar-resistant decorative laminates. For instance, U.S. Pat. No. 4,263,081 teaches the production of a mar-resistant laminate but further requires that a second layer of binder/mineral mixture be provided immediately below or above the first binder/mineral layer.

U.S. Pat. No. 4,305,987 is directed to an abrasion-resistant laminate meeting National Electric Manufacturers' Association (NEMA) standards relating to abrasive wear, strain resistance, heat resistance, impact resistance, dimensional stability and the like. The patent discloses a "stabilizing binder material" for the abrasion-resistant mineral. The patent also teaches the use of microcrystalline cellulose as the preferred binder material, acting as a suspending and binding agent and also compatible with melamine and polyester laminating resins.

U.S. Pat. No. 4,327,141 discloses an abrasion-resistant decorative laminate meeting National Electric Manufacturers Association (NEMA) standards. The abrasion-resistant laminate requires an additional layer of binder material immediately below or above the abrasion resistant coating.

U.S. Pat. No. 4,395,452 discloses a print sheet for use in the preparation of abrasion-resistant decorative laminates, and requires the presence of binder material "in an amount sufficient to bind and stabilize" the abrasion-resistant mineral to the surface of the paper sheet.

U.S. Pat. No. 4,400,423 also discloses a print sheet for use in the preparation of abrasion-resistant decorative laminates, however additionally discloses use of an additional layer of binder material immediately above or below the abrasion-resistant coating.

U.S. Pat. No. 4,430,375 teaches a decorative sheet for use in the preparation of abrasion-resistant decorative laminates and the use of a binder material. Additionally, the process for producing the laminate discloses a separate drying step to enhance the bonding of the abrasion-resistant mineral particles to the decorative sheet.

U.S. Pat. No. 4,499,137 discloses a scuff-resistant decorative laminate utilizing a wax lubricant having a melt temperature below 260° F. so as to avoid haze in the laminate.

Both U.S. Pat. No. 4,517,235 and 4,520,062 disclose an abrasion-resistant coating for decorative laminates in which a binder/mineral coating is transferred from a mold surface or flexible tape to the surface of the laminate. Additionally, a transfer carrier containing a non-resinous binder material and mineral abrasive particles is disclosed.

U.S. Pat. No. 4,532,170 discloses a facing sheet for a scuff-resistant decorative laminate, comprising a particulate lubricant and binder material for the lubricant particles, but excluding oxidized wax and silicone resin lubricants.

U.S. Pat. No. 4,567,087 teaches a scuff-resistant and abrasion-resistant decorative laminate comprising abrasion-resistant particles, binder material for the particles, and a lubricant which is not an oxidized wax or silicone resin.

U.S. Pat. No. 4,713,138 discloses a single step method of preparing a facing sheet for use as the uppermost sheet in the manufacture of an abrasion-resistant decorative laminate. The method teaches a binding material for the mineral that (1) withstands the subsequent laminating conditions, (2) is compatible with the thermosetting resin, (3) is present in an amount sufficient to bind the abrasion-resistant mineral to the surface of an unsaturated paper sheet, and (4) suspends the abrasion-resistant mineral particles in the liquid thermosetting resin.

Finally, U.S. Pat. No. 4,741,946 discloses scuff and abrasion-resistant decorative laminates in which finely divided lubricant wax particles are incorporated in or very near the surface of the solid-colored decorative paper. The lubricant is disclosed as not being an oxidized wax or silicone resin.

SUMMARY OF THE INVENTION

It is a principal object of this invention to provide laminates having excellent resistance to all known types of physical damage to the surface that cause marring or defacement. This includes scraping by a relatively sharp object of about equal hardness to the laminate resulting in a burnish mark (polished streak) or a chalk mark (transfer of material from the abrading object to the laminate); scratching by a very sharp object of about the same hardness as the grit in the laminate resulting in a groove of plowed away material; and mars such as a series of very closely spaced scratches caused by many very fine particles of about equal hardness to the grit in the laminate such as contained in sandpaper, a scouring pad or air-borne dirt trapped beneath a tool used to fabricate a laminate or an object slid across the installed laminate.

It is a further object of this invention to provide laminates which do not require the use of a separate grit binding step or a discrete binder; thus, allowing simultaneous coating and impregnating of the decorative paper sheet with a mixture containing both the thermosetting resin and the grit.

It is a further object of this invention to provide the above mentioned excellent scratch, mar, scrape and abrasion resistance in a laminate having a very even, uniformly fine textured matte finish providing a surface gloss of about 14 (Gardener 60°)

It is a further object of this invention to provide the above mentioned excellent scratch, mar, scrape and abrasion resistance in a laminate having a very even, uniform glossy surface finish.

It is still a further object of this invention to protect the expensive and delicate plates, used to produce high pressure decorative laminates, from undue or premature wear caused by the inclusion in the laminate surface of hard abrasive particles and to prevent an objectionable deposit of worn metal fragments on the surfaces of light colored laminates.

The foregoing objects and others are accomplished in accordance with the present invention by employing the preferred embodiments of the invention.

These and other objects of the present invention will be apparent from the detailed description given hereinafter. However, it should be understood that the detailed description and specific examples, while indicative of the preferred embodiment of the invention, are given by way of illustration only, because various changes and modifications within the spirit and scope of the invention will become apparent from this detailed description to those skilled in the art.

In accordance with these objectives of the present invention, a new high pressure decorative laminate has been developed which has excellent resistance to scratching, marring, scraping and abrasion.

The decorative laminates having excellent scratch, mar, scrape and abrasion resistance utilize a coating formulation which comprises a thermosetting resin; abrasion resistant particles, of a particle size and in a concentration sufficient to provide for abrasion resistance; a coupling agent in an amount dependent upon the concentration of the abrasion resistant particles; a thickening agent in an amount sufficient to suspend the abrasion resistant particles; and a lubricating agent in a concentration sufficient to impart scrape resistance to the decorative laminate.

DETAILED DESCRIPTION OF THE EMBODIMENTS

The preferred embodiment for the decorative laminates having excellent scratch, mar, scrape and abrasion resistance utilize a coating formulation mixture comprising melamine-formaldehyde resin to which the following is added, in terms of weight units per weight units of wet resin 1.6 percent w./w. wet resin $Al_2O_3$ (alumina) grit particles having a particle size or at least 25 microns; 0.8 percentage w./w. wet resin $Al_2O_3$ (alumina) grit particles having a particle size of at least 3 microns; from about 0.3 percent w./w. wet resin to about 1.2 percent w./w. wet resin polyvinyl alcohol; 0.25 percent silane coupling agent based upon the amount of grit used; 0.075 percent w./w. wet resin xanthan gum thickener; and 0.1 percent polythylene glycol distearate having a molecular weight of about 6000. The melamine-formaldehyde resin may also be modified with a plasticizer and/or an acid catalyst if a more flexible wear-resistant laminate is desired. The preferred catalyst is paratoluene sulfonic acid; however, any kind of acid such as magnesium bromide, hydrochloric acid, sulfuric acid or the like may be utilized as a catalyst.

The melamine formaldehyde resin coating formulation additionally contains polyvinyl alcohol as an auxiliary slip agent. A polyethylene wax known by the tradename AC316 from Allied Chemical Company was evaluated as an auxiliary slip agent, however was found to impart haze and blur to the resulting decorative laminate. The polyvinyl alcohol functions to impart resistance to marks from sliding objects (sometimes referred to as "scuff": resistance) to the resulting laminate.

The melamine-formaldehyde resin coating formulation additionally contains a silane coupling agent the amount based upon the desired amount of grit utilized in the laminate; an alginate thickener such as xanthan gum to suspend the grit particles and protect the plates used in the laminate production process from undue wear causing metal mar marks on light colored laminates; and polyethylene glycol distearate having a molecular weight of about to enhance surface slip and improve scrape resistance of the laminate. The polyethylene glycol distearate having a molecular weight of about used in the resin coating formulation is preferred lubricating agent, as it provides scrape resistance. Zinc stearate and other lubricating compounds were evaluated for scrape resistance, but were found less effective.

The coating formulation may also contain a small amount (0.01–0.1 percent w./w. wet resin) of a surfactant designed to reduce surface tension of the coating to provide a smooth and a uniform deposition of the coating. An example of such agent is Silwet® L-77 from Union Carbide Co. L-77 is a dimethylpolyoloxane.

The decorative laminates and methods for producing same disclosed herein do not require the use of a separate grit (abrasion resistant mineral particle) binding step employing a discrete binder. Because the invention disclosed herein does not require a separate binding step or a discrete binder, simultaneous coating and impregnating of the decorative paper sheet with a mixture containing both the thermosetting resin and the grit can be undertaken to simplify the laminate production process and the laminate itself.

The resulting decorative laminate utilizing the melamine formaldehyde resin coating formulation as described above has excellent scratch resistance imparted by the 25 micron alumina grit. The laminate additionally has excellent mar resistance imparted by the 3 micron alumina grit. The 3 micron alumina grit, being smaller, has much more surface area and thus provides more complete coverage of the laminate surface. However, the larger, 25 micron alumina grit particles are necessary to provide scratch resistance to the laminate. This is because mar is produced by many very small, closely spaced particles covering a broad area of the abrading object and, because of the broad coverage, pressure is very low. In contrast, a scratch is produced by a single larger hard, sharp object that is under greater pressure as a result of its small contact area with the laminate surface.

Two processes may be used to produce the wear-resistant laminates having either a matte finish or glossy finish. It is well understood in the art that the surface finish of the resulting decorative laminate, whether a matte finish or glossy finish laminate is achieved, is dependent upon the surface texture of the pressing plates used in the consolidation of the laminate.

One process which may be used to produce the wear resistant decorative laminate is the sparge pipe process. With the sparge pipe process, the resin coating formulation is applied to a decorative paper sheet using a sparge pipe having many holes to spread the resin coating formulation uniformly across the top side of the decorative paper. A first sparge coating supplies nearly all of the required resin, about 80 percent of the resin normally used to saturate a decorative sheet to provide NEMA specified properties to a high pressure decorative laminate. In a second step, the wet resin-coated decorative paper is further dipped into an identically formulated resin coating mixture which supplies the remainder of the required resin. The total resin pick-up by the decorative sheet is regulated by metering-squeeze rollers. It has been found that inferior scratch and mar resistance is obtained if the decorative paper is dipped only into the resin coating formulation without the prior sparge process. The resin coated decorative paper and at least one backing sheet is dried and then heat and pressure consolidated using conventional techniques into a high pressure decorative laminate having excellent scratch, mar, scrape and abrasion resistance. It is well understood that more than one sheet of backing paper may be used to produce laminates of varying thicknesses.

The second process which may be used to produce the wear-resistant high pressure decorative laminates is the gravure pad coating process. With this process, the resin coating formulation is first applied to the surface of the raw decorative paper sheet using a gravure pad coating cylinder. When applied in this manner, the decorative paper sheet picks up only about 20 percent of the required amount of resin identified above so the percentage of grit in the coating formulation must be increased to about 15 percent so that a sufficient amount of the abrasive grit is imparted to the decorative sheet. In a second step subsequent to the gravure coating, either with or without an intermediate drying step, the decorative paper sheet is dipped into the resin coating formulation containing neat melamine-formaldehyde resin, which is resin which has not been modified with the abrasive grit, to supply the remainder of the required amount of resin to saturate the sheet. The resin pick-up by the decorative sheet is regulated by metering squeeze rollers. Coating the decorative sheet with a coating formulation which uses a neat melamine-formaldehyde resin has been found to render the coating process less damaging to the highly polished stainless steel plates used for producing high gloss laminates.

The coated decorative paper and at least one backing sheet is dried and then heat and pressure consolidated using conventional techniques into a high pressure decorative laminate having excellent scratch, mar, scrape and abrasion resistance. It is well understood that more than one backing sheet may be used to produce laminates of varying thicknesses.

In order to further define the specifics of the present invention, the following examples are provided and intended to illustrate the high pressure decorative laminate having improved scratch, mar, scrape and abrasion resistance and the process for producing the laminate, and not to limit the particulars of the present invention:

EXAMPLE 1

Laminate samples having a matte finish were subjected to four different testing procedures to measure scratch, mar, scrape and abrasion resistance. The matte laminate samples tested included:

(1) Standard FORMICA® brand high pressure decorative laminate having a matte finish;

(2) FORMICA® brand high pressure decorative laminate having a matte finish which additionally contained polyethylene glycol distearate having a molecular weight of about 6000 in the resin coating;

(3) FORMICA® brand high pressure decorative laminate having a matte finish which additionally contained 0.8 percent w./w. wet resin of 6 micron alumina grit particles in the resin coating, the resin coating being applied to the decorative sheet by dip and squeeze application;

(4) a high pressure decorative matte finish laminate produced by the sparge pipe process and having a decorative sheet impregnated with a resin coating formulation containing 1.5 percent w./w. wet resin micron alumina particle grit, xanthan gum and polyethylene glycol 6000 distearate:

(5) a high pressure decorative matte finish laminate produced by the sparge pipe process and having a decorative sheet impregnated with a resin coating formulation containing 1.6 percent w./w. wet resin 25 micron alumina particle grit, 0.8 percent w./w. wet resin 3 micron alumina particle grit, xanthan gum, and polyethylene glycol distearate having a molecular weight of about;

(6) a matte finish wear-resistant laminate known as NEVAMAR ARP®.

Each of the above-described laminate samples was subjected to the following four test procedures:

I. GLASS SCRATCH TEST

This test was designed to measure the ease with which a laminate could be scratched using a material of similar sharpness and hardness to ordinary silica, the usual scratching component in air-borne dirt. Scratches are very thin lines, usually several inches long and widely spaced one from another. Material is plowed out by the scratch-inducing agent and the indentation in the laminate surface can usually be felt by running a fingernail over it.

Each of the 6 laminate samples described above were scratched four times with the edge of a glass microscope slide (Fisher brand Cat. No. 12-550A 75×25 mm—non-frosted) held in a device to which loads of 25, 50, 100 and 200 grams could be applied. The laminate surfaces were observed visually and the resulting surface scratches were rated as follows:

0=no mark visible under these conditions

1=very, very faint scratch visible if tilted to a critical angle

2=very faint scratch—easier to see than a #1

3=faint scratch—fairly easy to see at most angles

4=easily visible scratch that will disappear at a critical angle

5=a scratch easily visible at any angle under good light.

The results were then totalled for all scratches on the particular laminate sample. The results appear in TABLE I below.

II. MAR-TEST

The mar resistance of each of the laminate samples was determined by rubbing the laminate surface under controlled conditions with an abrasive cloth (blue grit utility cloth grade 280J type 311 T, by 3M Company) and then measuring the change in surface gloss of the marred area as compared to the original surface gloss. The change in surface gloss was measured by a 60° glossmeter manufactured by Gardner Laboratory Division, Bethesda, Md.

The mar resistance for each laminate sample was calculated as follows:

$$\Delta G = \frac{100 \times (\text{original gloss} - \text{final gloss})}{(\text{original gloss})}$$

Mar resistance tends to depend disproportionately on the original background gloss of the laminate. The glossier the laminate, the higher the ΔG value. ΔG=the percent change in gloss (mar resistance)

NOTE: Burnishing (surface gloss increase), will be a negative value.

The results of the mar resistance for each laminate sample are set forth below in TABLE I.

III. SCRAPE TEST

This test was intended to measure the likelihood of the surface of one laminate to be scraped by the sharp corner of the surface of another laminate being dragged across it. Scrape is a long, narrow streak that may appear as a burnish (higher gloss) or as a whitish, chalky mark.

Each of the laminate samples were scraped five times using neutral gray, solid color FORMICA® brand laminate chips, grade 1058. The laminate surfaces of the samples were then visually observed and the surface scrapes were rated as follows:

0=no visible mark

1=a burnish (higher gloss) mark that disappears as the sample is rotated to various angles.

2=a burnish mark visible at all viewing angles.

3=a chalk mark that disappears as the sample is rotated at various angles.

4=a chalk mark visible at all viewing angles.

NOTE: If the scrape appeared to "skip" such as burnish to chalk or burnish to nothing, the scrape was graded according to the greatest severity of the scrape.

The results of the test were totalled and averaged for all scrapes on the particular laminate sample. The results appear in TABLE I below.

IV. ABRASION TEST

This test measured the ability of the surface of a high pressure decorative laminate to maintain its design and color when subjected to abrasive wear.

Each of the laminate samples were uniformly abraded for 750 cycles using 180 grit alumina oxide sandpaper strips ½ inch (12.7 mm) wide by 6 inches (152.4 mm) long. After 750 cycles, the resulting groove depth in the laminate surface was measured to determine abrasion resistance. The results of the abrasion resistance test are summarized below in TABLE I.

TABLE I

| SAMPLE | SCRATCH (0–20 scale) | MAR (% ΔG) | SCRAPE (0–4 scale) | ABRASION (Groove Depth at 750 cycles) (mils.) |
|---|---|---|---|---|
| 1 (Control) | 14 | 34 | 1–2 | — |
| 2 | 14 | 34 | 1 | — |
| 3 | 11 | 9 | 2–3 | 2.4 |
| 4 | 6.4 | −4.7 | 1.8 | 1.5 |
| 5 | 3.7 | −7.5 | 1.9 | 0.8 |
| 6 | 5 | −8.2 | 2 | 0.8 |

TABLE I shows that the standard FORMICA® brand laminate product having a matte finish had poor scratch and mar resistance and fair scrape resistance. The addition of small microgrit slightly improved scratch and substantially improved mar, but was detrimental to scrape resistance. Increasing the level of small grit, applying it to the decorative sheet surface with a sparge pipe and including the polyethylene glycol distearate, substantially improved scratch and mar resistance (a negative value means the sample burnished or became glossier when abraded) and the polyethylene glycol distearate improved scrape resistance in spite of the presence or grit. This higher level of surface applied grit also reduced the groove depth resulting from 750 cycles of abrasion. Finally, the mixed grit including the larger size 25 micron particles and the smaller size 3 micron particles, brought about a further improvement in scratch resistance and reduced the abrasion groove depth by half. The polyethylene glycol distearate continued to maintain good scrape resistance.

EXAMPLE 2

The purpose of this example was to test scratch, abrasion and mar resistance in wear-resistant high pressure decorative laminates having a glossy finish produced by either the sparge pipe process or gravure process and having varying amounts and particle sizes of alumina grit in the resin coating formulation impregnated in the decorative sheet.

The following eight laminate samples were tested:

(1) A control sample of glossy finish standard FORMICA® brand laminate having no alumina grit particles;

(2) A glossy finish laminate produced by the sparge pipe process and having 2.5 percent w./w. wet resin 3 micron alumina particle grit in the resin coating;

(3) A glossy finish laminate produced by the sparge pipe process and having 0.8 percent w./w. wet resin 9 micron alumina grit particles in the resin coating;

(4) A glossy finish laminate produced by the sparge pipe process and having 1.5 percent w./w. wet resin 9 micron alumina grit particles in the resin coating;

(5) A glossy finish laminate produced by the gravure process and having 10 percent w./w. wet resin 9 micron alumina grit particles in the resin coating;

(6) A glossy finish laminate produced by the gravure process and having 15 percent w./w. wet resin 9 micron alumina grit particles in the resin coating;

(7) A glossy finish laminate produced by the sparge pipe process and having a mixture of 1.6 percent w./w. wet resin 25 micron $Al_2O_3$ grit particles and 0.8 percent w./w. wet resin 3 micron $Al_2O_3$ grit particles in the resin coating;

(8) Nevamar® "Glossie" wear-resistant decorative laminate.

Each of the above laminates was tested for scratch resistance, abrasion resistance and mar resistance using the testing procedures previously described in EXAMPLE 1. The results of the testing are set forth below in TABLE II.

TABLE II

| Sample | Scratch Improvement (times better than control) | Abrasive Improvement (times better than control) | Mar Resistance Improvement (% improvement over control) |
| --- | --- | --- | --- |
| 1 (Control) | 1 | 1 | 0 |
| 2 | 1 | 0.9* | 94.3 |
| 3 | 1.4 | 1.3 | 93.7 |
| 4 | 2 | 1.4 | 98.0 |
| 5 | 2 | 2.8 | 99.2 |
| 6 | 7 | 3.6 | 99.8 |
| 7 | 14 | ∞** | 99.4 |
| 8 | 3.7 | 1.5 | 88.5 |

*This sample was black. All others in the series are white, containing high levels (30–35%) of $TiO_2$. $TiO_2$ itself provides a degree of wear resistance that is as good or better than 2.5% 3μ$Al_2O_3$ in a low ash (black) sample.
**The depth of a groove in the control laminate worn in by 500 cycles of sandpaper abrasion was divided by the depth of groove in each of the experimental laminate samples. The groove depth in Sample 7 was zero. Thus the ratio approaches infinity.

The data in TABLE II shows that virtually any inclusion of microgrit substantially improves mar resistance because all samples improved 93.7% to 99.8% in this property as compared to the control. This is a very narrow range and all experimental samples would be considered to have good mar resistance. However, when considering scratch resistance, only the samples with very high grit levels or the larger particle size grit have good values. The best sample (Sample 7) (mixed grit) is 14 times better than the control. The next best sample (Sample 6) is 7 times better, meaning that only half as good scratch resistance was achievable with the 9 micron particle size grit as compared to the 25 micron particle size grit. Finally, in abrasive wear, only Sample 7 made with 25 micron particle size grit showed an immeasurable groove depth after 500 abrasion cycles.

What is claimed is:

1. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns, both of which are present in a concentration sufficient to provide for abrasion resistance, the weight ratio of the larger particles to the smaller particles being 2 to 1;
(2) a coupling agent;
(3) a thickening agent in an amount sufficient to suspend said abrasion resistant mineral particles; and
(4) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material, such that about 80 percent of the amount of thermosetting resin required for saturation of said decorative sheet is impregnated into said decorative sheet;

dipping said resin impregnated decorative sheet into an identically formulated mixture of thermosetting resin and abrasion resistant material, such that the remaining amount of thermosetting resin required for saturation of said decorative sheet is impregnated into said resin impregnated decorative sheet;

metering the total amount of thermosetting resin impregnated into the decorative sheet by metering means; and drying and consolidating said resin impregnated decorative sheet using conventional heat and pressure laminating techniques, thereby obtaining a decorative laminate having improved scratch, mar, scrape and abrasion resistance.

2. The process according to claim 1, wherein said liquid thermosetting, impregnating resin is melamine formaldehyde resin.

3. The process according to claim 1, wherein said abrasion resistant mineral particles are alumina.

4. The process according to claim 1, wherein said coupling agent is silane.

5. The process according to claim 1, wherein said thickening agent is xanthan gum.

6. The process according to claim 1, wherein said lubricating agent is polyvinyl alcohol or polyethylene glycol distearate having a molecular weight of about 6000.

7. The process according to claim 2, wherein said melamine formaldehyde resin is modified with a plasticizer and a catalyst.

8. The process according to claim 1, wherein said coating and impregnating step is accomplished by a sparge pipe containing holes to allow for the uniform application of the mixture of thermosetting resin and abrasion resistant coating material onto the top surface of said decorative sheet.

9. The process according to claim 1, wherein said metering means are metering squeeze rollers.

10. A process for the production of decorative laminates having improved scratch, mar, scrape and abrasion resistance comprising the steps of:

preparing a mixture of (A) a melamine-formaldehyde resin and (B) an abrasion resistant material comprising:
(1) 0.8 percent abrasion resistant alumina particles having an average particle size of about 3 microns, said percentage measured by weight of the total wet weight of the melamine formaldehyde resin solution of the mixture and 1.6 percent abrasion resistant alumina particles having an average particle size of about 25 microns, said percentage measured by weight of the total wet weight of the melamine formaldehyde resin solution of the mixture;
(2) about 0.25 percent silane, said percentage measured by weight of the total wet weight of the melamine formaldehyde resin solution of the mixture;
(3) about 0.075 percent xanthan gum, said percentage measured by weight of the total wet weight of the melamine formaldehyde resin solution of the mixture; and
(4) about 0.3 percent to about 1.2 percent polyvinyl alcohol, said percentages measured by weight of the total wet weight of the melamine formaldehyde resin solution of the mixture or about 0.1 percent polyethylene glycol distearate having a molecular weight of about 6000, said percentage measured by weight of the total wet weight of the melamine-formaldehyde resin solution of the mixture;

simultaneously coating and impregnating a decorative paper sheet with said abrasion resistant alumina particles and said melamine-formaldehyde resin by uniformly coating said decorative sheet with said mixture of melamine-formaldehyde resin and abrasion resistant material, such that about 80 percent of the amount of melamine-formaldehyde resin required for saturation of said decorative sheet is impregnated into said decorative sheet;

dipping said melamine-formaldehyde resin impregnated decorative sheet into an identically formulated mixture of melamine-formaldehyde resin and abrasion resistant material, such that the remaining amount of melamine-formaldehyde resin required for saturation of said decorative sheet is impregnated into said resin impregnated decorative sheet;

metering the total amount of melamine-formaldehyde resin impregnated into the decorative sheet by metering-squeeze rollers; and drying and consolidating said melamine-formaldehyde resin impregnated decorative sheet using conventional heat and pressure techniques, thereby obtaining a decorative laminate having improved scratch, mar, scrape and abrasion resistance.

11. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns, both of which are present in a concentration sufficient to provide for abrasion resistance, the weight ratio of the larger particles to the smaller particles being 2 to 1;
(2) a coupling agent;
(3) a thickening agent in an amount sufficient to suspend said abrasion resistant mineral particles; and
(4) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material such that up to about 20 percent of the amount of thermosetting resin required for saturation of said decorative sheet is impregnated into the decorative sheet;

dipping said resin impregnated decorative sheet into an identically formulated mixture of thermosetting resin and abrasion resistant material, such that the remaining amount of thermosetting resin required for saturation of said decorative sheet is impregnated into the resin impregnated decorative sheet;

metering the total resin impregnated into the resin impregnated decorative sheet by metering means; and drying and consolidating said resin impregnated decorative sheet using conventional heat and pressure laminating techniques, thereby obtaining a decorative laminate having improved scratch, mar, scrape and abrasion resistance.

12. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns in a concentration sufficient to provide for abrasion resistance, the weight ratio of the larger particles to the smaller particles being 2 to 1;
(2) a coupling agent;
(3) a thickening agent in an amount sufficient to suspend said abrasion resistant mineral particles; and
(4) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material such that about 20 percent of the amount of thermosetting resin required for saturation of said decorative sheet is impregnated into said decorative sheet;

dipping said resin impregnated decorative sheet into a neat thermosetting resin, such that the remaining amount of thermosetting resin required for saturation is impregnated into the resin impregnated decorative sheet;

metering the total resin impregnated into the resin impregnated decorative sheet by metering means; and drying and consolidating said resin impregnated decorative sheet using conventional heat and pressure laminating techniques, thereby obtaining a decorative laminate having improved scratch, mar, scrape and abrasion resistance.

13. The process according to claim 11 or 12, wherein said abrasion resistant mineral particles comprise about 15 percent by weight of the total wet weight of the melamine formaldehyde resin solution of said mixture.

14. The process according to claim 11 or 12, wherein said abrasion resistant mineral particles are alumina.

15. The process according to claim 11 or 12, wherein said coupling agent is silane.

16. The process according to claim 11 or 12, wherein said thickening agent is xanthan gum.

17. The process according to claim 11 or 12, wherein said lubricating agent is polyvinyl alcohol or polyethylene glycol distearate having a molecular weight of about 6000.

18. The process according to claim 11 or 12, wherein said coating and impregnating step is accomplished by a gravure pad coating cylinder.

19. The process according to claim 11 or 12, wherein said metering means are metering squeeze rollers.

20. The process according to claim 12 further comprising the step of drying said resin impregnated decorative sheet prior to the dipping step.

21. A process for the production of decorative laminates having improved scratch, mar and abrasion resistance comprising the steps of:

preparing a mixture of (A) melamine-formaldehyde impregnating resin and (B) an abrasion resistant material comprising:

(1) a first amount of abrasion resistant alumina particles having an average particle size of about 3 microns and a second amount of abrasion resistant alumina particles having an average particle size of about 25 microns, the weight ratio of the larger particles to the smaller particles being 2 to 1, wherein the entire amount of said abrasion resistant alumina particles comprise about 15 percent by weight of the total wet weight of the melamine-formaldehyde resin solution of said mixture;

(2) about 0.25 percent silane, said percentage measured by weight of the total wet weight of the melamine-formaldehyde resin solution;

(3) about 0.075 percent xanthan gum, said percentage measured by weight of the total wet weight of the melamine-formaldehyde resin solution; and (4) about 0.3 percent to about 1.2 percent polyvinyl alcohol, said percentages measured by weight of the total wet weight of the melamine-formaldehyde resin solution or about 0.1 percent polyethylene glycol distearate having a molecular weight of about 6000, said percentage measured by weight of the total wet weight of the melamine-formaldehyde resin solution;

simultaneously coating and impregnating a decorative paper sheet with said abrasion resistant particles and said melamine-formaldehyde resin by uniformly coating said decorative sheet with said mixture of melamine-formaldehyde resin and abrasion resistant material such that about 20 percent of the amount of melamine-formaldehyde resin required for saturation of said decorative sheet is impregnated into said decorative sheet;

dipping said resin impregnated decorative sheet into an identically formulated mixture of melamine-formaldehyde resin and abrasion resistant material, such that the remaining amount of melamine-formaldehyde resin required for saturation of said decorative sheet is impregnated into said resin impregnated decorative sheet;

metering the total melamine-formaldehyde resin impregnated into the resin impregnated decorative sheet by metering squeeze rollers; and drying and consolidating said resin impregnated decorative sheet using conventional heat and pressure techniques, thereby obtaining a decorative laminate having improved scratch, mar, scrape and abrasion resistance.

22. A process for the production of decorative laminates having improved scratch, mar and abrasion resistance comprising the steps of:

preparing a mixture of (A) a melamine-formaldehyde impregnating resin and (B) an abrasion resistant material comprising:

(1) a first amount of abrasion resistant alumina particles having an average particle size of about 3 microns and a second amount of abrasion resistant alumina particles having an average particle size of about 25 microns, the weight ratio of the larger particles to the smaller particles being 2 to 1, wherein the entire amount of said abrasion resistant alumina particles comprise about 15 percent by weight of the total wet weight of the melamine-formaldehyde resin solution of said mixture;

(2) about 0.25 percent silane, said percentage measured by weight of the total wet weight of the melamine-formaldehyde resin solution of said mixture;

(3) about 0.075 percent xanthan gum, said percentage measured by weight of the total wet weight of the melamine-formaldehyde resin solution of said mixture; and (4) about 0.3 percent to about 1.2 percent polyvinyl alcohol, said percentages measured by weight of the total wet weight of the melamine-formaldehyde resin solution of said mixture or about 0.1 percent polyethylene glycol distearate having a molecular weight of about 6000, said percentage measured by weight of the total wet weight of the melamine-formaldehyde resin solution of said mixture;

simultaneously coating and impregnating a decorative paper sheet with said abrasion resistant particles and said melamine-formaldehyde resin by uniformly coating said decorative sheet with said mixture of melamine-formaldehyde resin and abrasion resistant material such that about 20 percent of the amount of melamine-formaldehyde resin required for saturation of said decorative sheet is impregnated into said decorative sheet;

dipping said resin impregnated decorative sheet into a neat melamine-formaldehyde resin, such that the remaining amount of resin required for saturation of said decorative sheet is impregnated into said resin impregnated decorative sheet;

metering the total melamine-formaldehyde resin impregnated into the resin impregnated decorative sheet by metering-squeeze rollers; and drying and consolidating said resin impregnated decorative sheet using conventional heat and pressure techniques, thereby obtaining a decorative laminate having improved scratch, mar, scrape and abrasion, resistance.

23. The process according to claim 22 further comprising the step of drying said resin impregnated decorative sheet prior to the dipping step.

24. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns, both of which are present in a concentration sufficient to-provide for abrasion resistance, the weight ratio of the larger particles to the smaller particles being 2 to 1;
(2) a thickening agent in an amount sufficient to suspend said abrasion resistant mineral particles; and
(3) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material, such that about 80 percent of the amount of thermosetting resin required for saturation of said decorative sheet is impregnated into said decorative sheet;

dipping said resin impregnated decorative sheet into an identically formulated mixture of thermosetting resin and abrasion resistant material, such that the remaining amount of thermosetting resin required for saturation of said decorative sheet is impregnated into said resin impregnated decorative sheet;

metering the total amount of thermosetting resin impregnated into the decorative sheet by metering means; and drying and consolidating said resin impregnated decorative sheet using conventional heat and pressure laminating techniques, thereby obtaining a decorative laminate having improved scratch, mar, scrape and abrasion resistance.

25. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns, both of which are present in a concentration sufficient to provide for abrasion resistance, the weight ratio of the larger particles to the smaller particles being 2 to 1;
(2) a thickening agent in an amount sufficient to suspend said abrasion resistant mineral particles; and
(3) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material such that up to about 20 percent of the amount of thermosetting resin required for saturation of said decorative sheet is impregnated into the decorative sheet;

dipping said resin impregnated decorative sheet into an identically formulated mixture of thermosetting resin and abrasion resistant material, such that the remaining amount of thermosetting resin required for saturation of said decorative sheet is impregnated into the resin impregnated decorative sheet;

metering the total resin impregnated into the resin impregnated decorative sheet by metering means; and drying and consolidating said resin impregnated decorative sheet using conventional heat and pressure laminating techniques, thereby obtaining a decorative laminate having improved scratch, mar, scrape and abrasion resistance.

26. A process for the production of decorative laminates having improved scratch, mar, scrape and abrasion resistance comprising the steps of:

preparing a mixture of (A) a liquid thermosetting, impregnating resin and (B) an abrasion resistant material comprising:
(1) a first amount of abrasion resistant mineral particles having an average particle size of about 3 microns and a second amount of abrasion resistant mineral particles having an average particle size of about 25 microns in a concentration sufficient to provide for abrasion resistance, the weight ratio of the larger particles to the smaller particles being 2 to 1;
(2) a thickening agent in an amount sufficient to suspend said abrasion resistant mineral particles; and
(3) lubricating agents in a concentration sufficient to provide for scrape resistance;

simultaneously coating and impregnating a decorative paper sheet with said abrasion resistant mineral particles and said thermosetting resin by uniformly coating said decorative sheet with said mixture of thermosetting resin and abrasion resistant material such that about 20 percent of the amount of thermosetting resin required for saturation of said decorative sheet is impregnated into said decorative sheet;

dipping said resin impregnated decorative sheet into a neat thermosetting resin, such that the remaining amount of thermosetting resin required for saturation is impregnated into the resin impregnated decorative sheet;

metering the total resin impregnated into the resin impregnated decorative sheet by metering means; and drying and consolidating said resin impregnated decorative sheet using conventional heat and pressure laminating techniques, thereby obtaining a decorative laminate having improved scratch, mar, scrape and abrasion resistance.

* * * * *